Dec. 8, 1953
A. U. BRYANT
2,661,762
VALVE CONSTRUCTION
Filed Aug. 15, 1949
2 Sheets-Sheet 1
FIG_1_
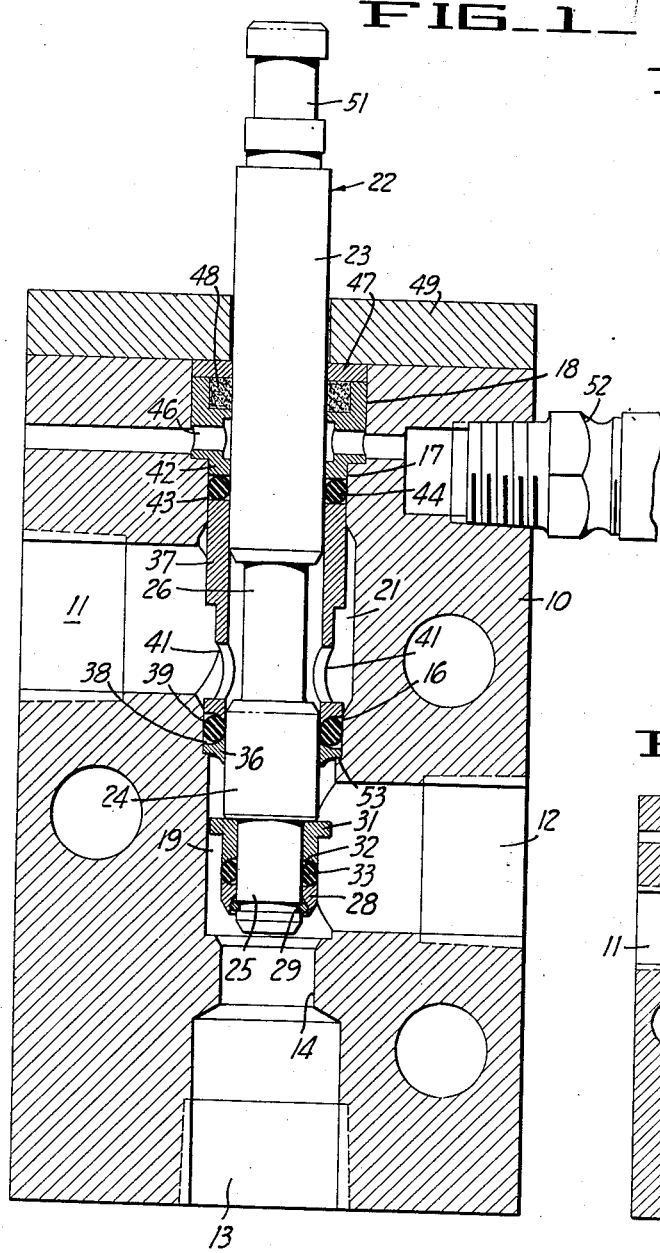
FIG_2_
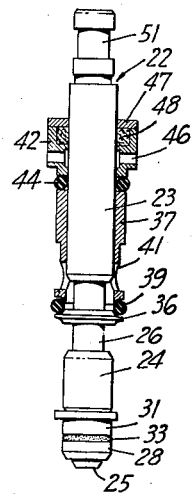
FIG_3_
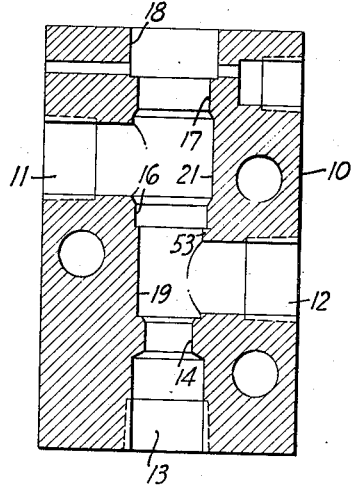
INVENTOR.
Austin U. Bryant
BY *Fleher & Swain*
ATTORNEYS

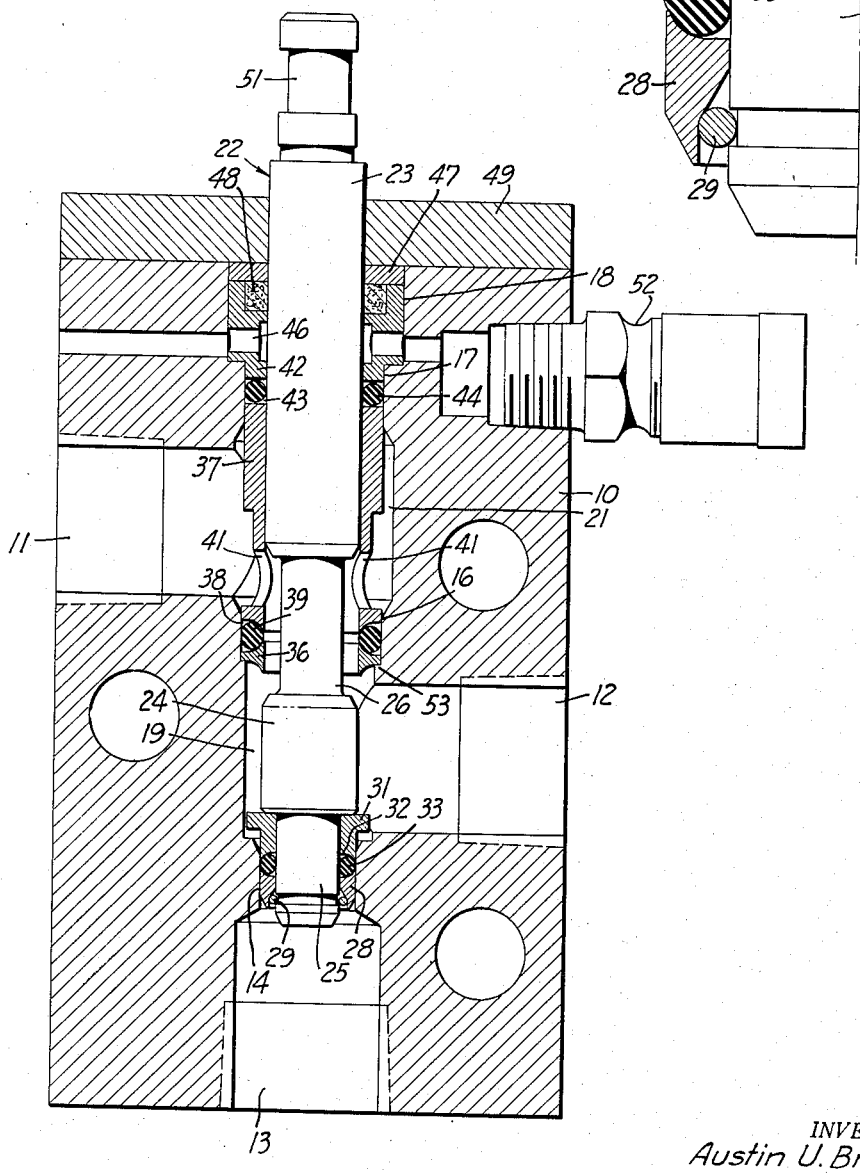

Patented Dec. 8, 1953

2,661,762

UNITED STATES PATENT OFFICE 2,661,762

VALVE CONSTRUCTION

Austin U. Bryant, Berkeley, Calif., assignor, by mesne assignments, to Grove Regulator Company, Emeryville (Oakland), Calif., a corporation of California Application August 15, 1949, Serial No. 110,350

1 Claim. (Cl. 137—454.7)

This invention relates generally to the construction of valves for resisting fluid pressure and controlling fluid flow. The present application is a continuation-in-part of subject matter disclosed in my copending applications Serial No. 3,728, filed January 22, 1948, and 100,225, filed June 20, 1949.

In copending application Serial No. 3,728, filed January 22, 1948, there is disclosed a valve construction making use of a seal ring of resilient material, or what is commonly referred to as a resilient O ring. As explained in said copending application the resilient O ring, which is generally made of suitable synthetic rubber, is retained within a groove and has either its inner or outer peripheral surface in slidable sealed contact with a cooperating annular valve part. In the construction disclosed and claimed in said copending application 3,728, the outflow side of the annular retaining recess for the resilient O ring, and particularly that corner of the recess which is remote from the surface with which the O ring is in sliding contact, is vented to the outflow side of the valve to aid in retaining the O ring in its accommodating recess, when the valve is moved from closed to open positions. In said copending application Serial No. 100,225, one or both of the end shoulders forming the retaining groove or recess for the O ring, are cupped in such a manner as to enable certain advantages, including particularly minimizing friction between the O ring and the valve part which moves relative to the same, reducing wear upon the O ring, and enabling use of the valve for higher operating pressures.

The present invention is an improvement on valves of the above character, and in particular provides an improved construction with respect to the manner in which the resilient O ring or rings are retained in the assembly.

Another object of the invention is to provide an improved type of multiport valve of the plunger type, making use of one or more resilient O rings.

Another object of the invention is to provide a valve assembly of the above character in which the working parts can be readily removed from the body for repair or replacement.

Another object of the invention is to provide a valve of the above character which is particularly well adapted for controlling the operation of other appliances.

Additional objects and features of the invention will appear from the following description in which the preferred embodiment has been set forth in detail in conjunction with the accompanying drawing.

Referring to the drawing:

Figure 1 is a side elevational view, partly in section, illustrating a valve incorporating the present invention.

Figure 2 is a side elevational view of the working parts of the valve, removed from the body, and on a reduced scale.

Figure 3 is a sectional view illustrating the body incorporated in the valve construction.

Figure 4 is an enlarged cross-sectional detail showing the manner in which the resilient O rings form sealing engagement between the body and the inner movable valve plunger.

Figure 5 is a view like Figure 1 but showing the plunger in its other operating position.

The valve as illustrated in Figure 1 consists of a body 10, provided with flow passages 11, 12 and 13, and bored to receive the complete assembly of Figure 2. Thus the body is formed to provide the bore 14, which is interposed between the passages 12 and 13, the bore 16 which connects the passages 11 and 12, the bore 17 which is adjacent passage 11, and the entrant bore 18. Between the bores 14 and 16 there is an enlargement 19 communicating with the passage 12. There is a similar enlargement 21 between the bores 16 and 17, and which is in communication with the passage 11.

The valve assembly of Figure 2, which can be inserted in the body, consists of a valve plunger designated generally at 22. This plunger is formed with two aligned cylindrical portions 23 and 24, together with an end cylindrical portion 25 (Figure 1) on a smaller diameter. That portion 26 of the plunger which connects the portions 23 and 24, is of a reduced diameter to form a fluid passage.

The parts assembled on the plunger 22 include the lower metal retaining ring 28, which is held upon the plunger portion 25 by the snap-on ring 29. A metal sleeve 31 is slidably fitted upon the plunger portion 25, and between the opposed end faces of the retaining ring 28 and the sleeve 31, there is an annular space 32 for accommodating the resilient seal ring 33. It is desirable that this seal ring, together with the other seal rings to be presently described, be formed circular in transverse cross-sectional contour, and formed of suitable resilient material such as synthetic rubber. Such rings are commonly known in the trade as O rings.

The upper end face of the retaining ring 28 (Figure 4) and the lower end face of the sleeve 31, are preferably cupped as illustrated in Figure 4, and as disclosed in my copending application Serial No. 100,225. The O ring 33 is so proportioned that when the plunger is moved downwardly to its lower limiting position (see Figure 5) the O ring is compressed radially and forms a fluid tight seal between the cylindrical valve portion 25, and the bore 14.

Another ring 36, together with a sleeve 37, surround the plunger, and form between them an annular recess 38 for accommodating the resilient O ring 39. This O ring forms an effective seal between the surface of the bore 16 and the plunger portion 24, for the position of the valve illustrated in Figure 1. The sleeve 37 is provided with ports 41 which permit fluid flow between the passages 11 and 12, when the plunger portion 24 is moved downwardly out of sealing engagement with the O ring 39. The opposed end faces of ring 36 and sleeve 37 are likewise preferably cupped, in the same manner as the ring 28 and sleeve 31.

Sleeve 37 cooperates with another sleeve 42, to form a space 43 for accommodating the resilient O ring 44. This O ring seals about the plunger portion 23, to prevent leakage of fluid from the body. Sleeve 42 is provided with ports or openings 46, for application of lubricant as will be presently explained. An end washer 47 cooperates with the sleeve 42, and serves to form an annular space for accommodating the lubricant wiping ring 48. The washer 47, together with sleeve 42, are held in place by a removable bonnet or cover plate 49.

The exterior end portion 51 of the plunger can be suitably formed to facilitate engagement with any one of a number of operating devices. For example the plunger can be connected to hand operating gear, to a fluid pressure operated diaphragm, or an electric solenoid or other motive means. The operating means should operate between fixed limiting positions, corresponding to the two operating positions of the valve plunger illustrated in Figures 1 and 5.

A suitable lubricant fitting 52, such as a conventional grease cup can be applied to the body and connected to supply lubricant to the ports 46.

Before describing the mode of operation of the valve, it can be pointed out that the retaining ring 28 fits loosely upon the plunger portion 25, so that the recess 32 for the resilient O ring 33 is vented to the fluid passage 13 for the position of the valve parts illustrated in Figure 5, in order to secure the advantages disclosed and claimed in copending application Serial No. 3,728, filed January 22, 1948. Retaining ring 36 similarly loosely fits the bore 16, and normally is seated upon the annular shoulder 53 formed in the body. Thus the outer and lower corner of the recess 38, which accommodates the resilient O ring 39, is vented to the passage 12, for the position of the valve illustrated in Figure 1.

Assembly and operation of my valve can now be described as follows: The operating parts of the valve, with the exception of the body and the cover plate 49, are assembled upon the plunger in the manner illustrated in Figure 2. The retaining ring 36, sleeve 37, sleeve 42, and associated parts are permitted to slip farther upon the plunger 22 (Figure 2) than their normal operating position. With the cover plate 49 removed, this assembly is now inserted into the body 10. Due to the progressive diameters of the bores in the body, the entire assembly can enter the body until the retaining ring 36 seats upon the shoulder 53. Thereafter the plunger 22 can continue to move inwardly until located in the operating position illustrated in Figure 1, or in the other operating position shown in Figure 5. The cover plate 49 is now attached to the body. Assuming that passage 11 forms an inlet and is connected to fluid under pressure, that the passage 12 forms an outlet, and that the passage 13 forms a vent, when the plunger 22 is in the position illustrated in Figure 1, the resilient O ring effectively seals between the plunger 24 and the surface of the body bore 16, thus preventing flow of fluid from the inlet 11 to the passage 12. At the same time passage 12 is in free communication through bore 14 with the passage 13, thus permitting any back pressure applied to passage 12 to vent through the passage 13. When the plunger 22 is moved to its other limiting position illustrated in Figure 5, the passages 11 and 12 are connected through the port formed about the plunger portion 26, and the lower end portion 25 of the plunger is sealed with respect to the body bore 14, by the resilient O ring 33. Thus at this time fluid pressure from passage 11 is applied to passage 12.

When one desires to make repair or replacement of certain of the working parts, it is only necessary to remove the cover plate 49, after which the plunger and all of the parts associated with the same are retracted as one complete assembly. As one commences to retract the plunger, the plunger first moves outwardly until the sleeve 31 engages the retaining ring 36 Thereafter further retraction of the plunger lifts the retaining ring 36 from the sealing shoulder 53 and this causes all of the other parts of the assembly, including the sleeves 37 and 42, to be lifted out of the body together with the plunger. When the complete assembly is retracted from the body, it is a simple matter to discover any defective parts, and to make replacement of worn parts, such as worn O rings. Thereafter the assembly is returned to the body in the manner previously described.

Because the recesses for accommodating the O rings 33 and 39, are vented to the low pressure side, in the same manner as disclosed in said copending application Serial No. 3,728, these O rings are effectively retained within their accommodating recesses when the plunger is moved between its operating positions. Because of the cupping of the end shoulders against which the resilient O rings are pressed by pressure, wear upon the O rings is reduced to a minimum, friction against movement of the plunger when pressure is applied is reduced and the valve is capable of being used with higher rate of pressures, all as described in the aforesaid copending application Serial No. 100,225.

I claim:

In a valve of the character described, a body having passages for flow of fluid therethrough, a bore formed in the body, a plunger disposed in the bore and movable axially between limiting open and closed positions to control flow through the body, a pair of first and second annular sleeves disposed end to end and surrounding one portion of said plunger, a shoulder formed on the body serving to seat the first one of said sleeves, an annular resilient seal ring contacting the plunger and providing a direct fluid seal between the plunger and the body, the adjacent ends of said sleeves being formed to provide an annular recess to loosely accommodate said annular resilient seal ring, the second one of said annular sleeves loosely fitting the plunger and body, said second sleeve being ported and the ports in the same communicating with one of said flow passages, another annular resilient seal ring surrounding the plunger and positioned adjacent that end of the second sleeve which is remote from said adjacent ends, said second ring being adapted to contact the plunger and providing a direct seal between the plunger and the body for closed position of the plunger, an annular retaining ring loosely fitted within the body adjacent the outflow side of said second seal ring, said retaining ring and said sleeve being shaped to form between them an annular recess for loosely accommodating said other seal ring, a shoulder formed on the body and serving to seat said retaining ring, said shoulder being faced toward the inflow side of the valve, and means carried by the plunger serving to engage said retaining ring to effect removal of the same together with said first and second sleeves and said annular seal rings when said plunger is retracted from the body, said plunger having a portion of reduced diameter located between said seal rings for closed position of the valve, said portion being movable to a position within the second seal ring for open position of the valve.

AUSTIN U. BRYANT.

References Cited in the file of this patent

UNITED STATES PATENTS

| Number | Name | Date |
|---|---|---|
| 1,812,104 | Mason | June 30, 1931 |
| 1,988,966 | Eckhouse | Jan. 22, 1935 |
| 2,089,848 | Hoferle | Aug. 10, 1937 |

FOREIGN PATENTS

| Number | Country | Date |
|---|---|---|
| 7,142 | Great Britain | of 1909 |